United States Patent
Johnson

(10) Patent No.: US 9,776,658 B2
(45) Date of Patent: Oct. 3, 2017

(54) APPARATUS FOR TURNING STEERABLE VEHICLE WHEELS

(71) Applicant: TRW Automotive U.S. LLC, Livonia, MI (US)

(72) Inventor: James Johnson, Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 27 days.

(21) Appl. No.: 14/436,548

(22) PCT Filed: Nov. 1, 2013

(86) PCT No.: PCT/US2013/067971
§ 371 (c)(1),
(2) Date: Apr. 17, 2015

(87) PCT Pub. No.: WO2014/071133
PCT Pub. Date: May 8, 2014

(65) Prior Publication Data
US 2016/0167703 A1    Jun. 16, 2016

Related U.S. Application Data

(60) Provisional application No. 61/721,108, filed on Nov. 1, 2012.

(51) Int. Cl.
*B62D 5/04* (2006.01)
*B62D 5/12* (2006.01)
*B62D 3/12* (2006.01)

(52) U.S. Cl.
CPC .................. *B62D 5/12* (2013.01); *B62D 3/12* (2013.01)

(58) Field of Classification Search
CPC .............. B62D 5/22; B62D 5/12; B62D 3/12
See application file for complete search history.

(56) References Cited

U.S. PATENT DOCUMENTS

| | | | |
|---|---|---|---|
| 3,605,933 A * | 9/1971 | Millard | B62D 5/22 180/428 |
| 3,944,015 A | 3/1976 | Bishop | |
| 4,492,283 A * | 1/1985 | Bertin | B62D 5/083 137/625.21 |
| 4,588,198 A * | 5/1986 | Kanazawa | B62D 7/22 280/90 |
| 4,819,499 A | 4/1989 | Morell | |
| 4,838,106 A * | 6/1989 | Adams | B62D 5/0424 180/443 |
| 6,039,334 A * | 3/2000 | Ozeki | B62D 5/22 280/93.514 |
| 7,210,553 B2 | 5/2007 | Williams et al. | |

(Continued)

*Primary Examiner* — Kevin Hurley
*Assistant Examiner* — Marlon A Arce
(74) *Attorney, Agent, or Firm* — Tarolli, Sundheim, Covell & Tummino LLP

(57) ABSTRACT

An apparatus for use in turning steerable vehicle wheels includes an axially movable steering member. The steering member turns the steerable vehicle wheels upon axial movement of the steering member. A connector arm connected to the steering member is movable with the steering member. A first fastener connects the connector arm to the steering member and prevents relative movement between the steering member and the connector arm. A second fastener connects the connector arm to the steering member.

14 Claims, 2 Drawing Sheets

(56) References Cited

U.S. PATENT DOCUMENTS

2005/0093264 A1    5/2005   Klais et al.
2008/0257634 A1   10/2008   Kogel et al.
2010/0109273 A1    5/2010   Moriyama et al.
2010/0289238 A1   11/2010   Archer et al.
2012/0018991 A1    1/2012   Murakami
2013/0240287 A1    9/2013   Williams et al.

\* cited by examiner

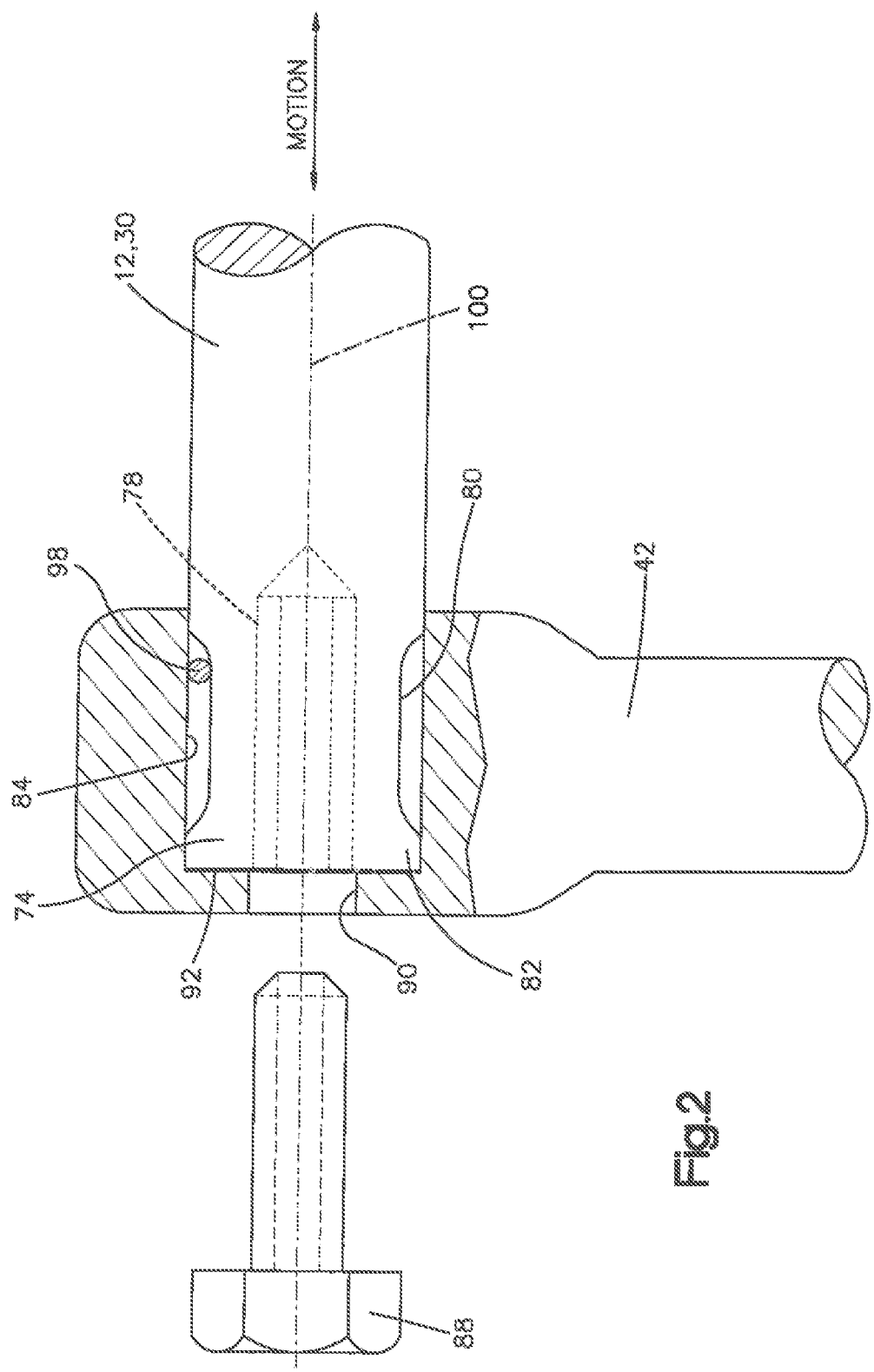

US 9,776,658 B2

APPARATUS FOR TURNING STEERABLE VEHICLE WHEELS

RELATED APPLICATIONS

This application corresponds to PCT/EP2013/087971, filed Nov. 1, 2013, which claims the benefit of U.S. Provisional Application Ser. No. 61/721,108, filed Nov. 1, 2012, the entirety of which are incorporated herein by reference.

TECHNICAL FIELD

The present invention relates to an apparatus for use in turning steerable vehicle wheels and, more specifically, to a connection between a rack of a rack and pinion steering gear and a connector arm.

BACKGROUND OF THE INVENTION

A known vehicle steering apparatus includes a steering member which is linearly movable to effect turning movement of steerable vehicle wheels. A pinion is disposed in meshing engagement with a rack portion of the steering member. A steering column interconnects the pinion and a vehicle steering wheel. The steering member may be connected to a hydraulic motor which is connected with the steerable vehicle wheels by tie rods. The steering member is connected to a piston of the motor by a connector arm. A threaded bolt extends through the connector arm in an axial direction of the rack. If the threaded bolt fails, steering control of the vehicle may be lost.

SUMMARY OF THE INVENTION

The present invention relates an apparatus for use in turning steerable vehicle wheels. The apparatus includes an axially movable steering member. The steering member turns the steerable vehicle wheels upon axial movement of the steering member. A connector arm connected to the steering member is movable with the steering member. A first fastener connects the connector and to the steering member and prevents relative movement between the steering member and the connector arm. A second fastener connects the connector arm to the steering member.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 2 is a schematic view of a connection between a rack and a connector and of the apparatus of FIG. 1.

DETAILED DESCRIPTION OF AN EXEMPLARY EMBODIMENT

Figure 1:
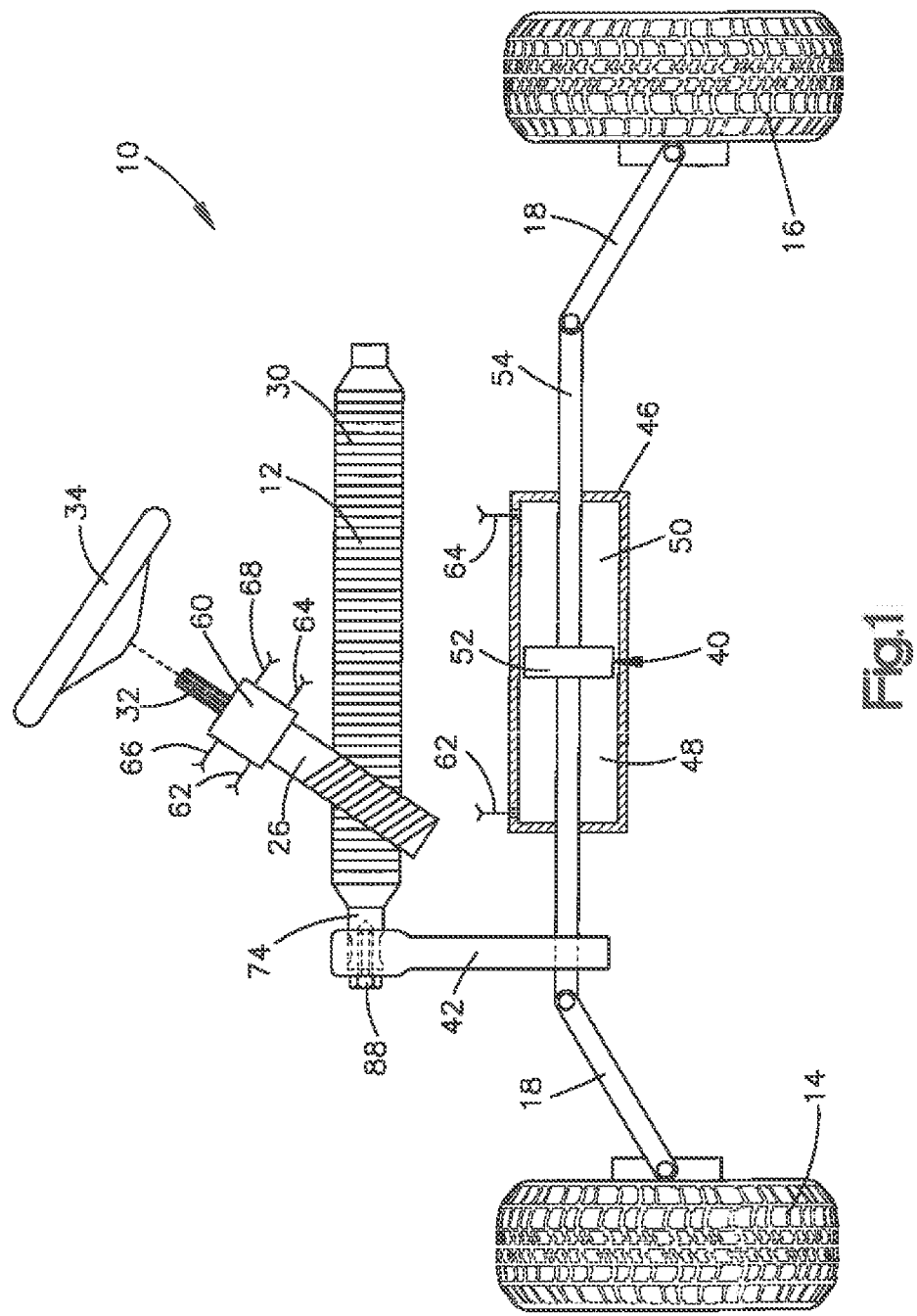
FIG. 1 is a schematic view of an apparatus for use in turning steerable vehicle wheels constructed in accordance with the present invention.

The present invention relates to an apparatus for use in turning steerable vehicle wheels. FIG. 1 illustrates an apparatus 10 constructed in accordance with the present invention and used to turn steerable vehicle wheels. The apparatus 10 includes a steering member or rack 12 which is connected to steerable vehicle wheels 14 and 16 by a steering linkage 18. A pinion 26 is in meshing engagement with a rack portion 30 of the steering member 12 such that rotation of the pinion results in axial or linear movement of the steering member 12. In particular, the rack portion 30 includes rack gear teeth disposed in meshing engagement with gear teeth on the pinion 26. The pinion 26 is connected to a steering column 32 that includes a rotatable steering wheel 34.

Upon rotation of the steering wheel 34, force is transmitted through the steering column 32 to the pinion 26. The pinion 26 thereby rotates under the influence of force transmitted through the steering column 32. Due to the meshed engagement between the pinion 26 and the rack portion 30, rotation of the steering wheel 34 and, thus, rotation of the pinion results in linear movement of the steering member or rack 12.

The apparatus 10 includes a hydraulic power steering motor 40 that provides steering assist. A connector arm 42 mechanically connects the motor 40 to the steering member 12. The motor 40 includes a cylinder 46 that defines a pair of fluid chambers 48, 50 positioned on opposite sides of a movable piston 52. A rod 54 connects the piston 52 to each steering linkage 18. The rod 54 extends parallel to the steering member 12 and is connected to the connector arm 42. The rod 54 may be connected to the connector arm 42 in any desired manner.

A valve assembly 60 directs hydraulic fluid to and from the motor 40. The valve assembly 60 is connected with the pinion 26. The power steering motor 40 (FIG. 1) is connected with the valve assembly 60 by hydraulic fluid conduits 62 and 64. The valve assembly 60 is supplied with hydraulic fluid by a power steering pump (not shown) through a supply conduit 66 and is connected with a fluid reservoir (not shown) through a drain conduit 68. The valve assembly 60 may have any known construction.

A first or left (as viewed in FIG. 1) end portion 74 of the steering member or rack 12 is connected with the connector arm 42. The first end portion 74 (FIG. 2) of the steering member 12 has an axially extending threaded opening 78. A reduced diameter portion 80 of the steering member 12 circumscribes the threaded opening 78. The reduced diameter portion 80 defines a lip 82 on the end portion 74 of the rack 12. Although the rack 12 is shown as having a reduced diameter portion 80, it is contemplated that the rack may only have a groove in a radial outer surface of the rack.

The first end portion 74, including the reduced diameter portion 80, extends into an opening 84 in the connector arm 42. The opening 84 in the connector arm 42 has a diameter greater than the diameter of the reduced diameter portion 80 of the steering member or rack 12 so that the reduced diameter portion of the steering member is spaced from the connector arm. A first fastener 88, such as a bolt, connects the first end portion 74 of the rack 12 to the connector arm 42. The first fastener or bolt 88 extends through an opening 90 in the connector arm 42. The bolt 88 threadably engages the threaded opening 78 in the rack 12. The head of the fastener 88 engages the connector arm 42 and clamps the connector arm to an axial end surface 92 of the rack 12 to connect the rack to the connector arm. The first fastener 88 prevents relative movement between the steering member or rack 12 and the connector arm 42. Therefore, the steering member or rack 12 and the rod 54 move together relative to the cylinder 46. Although the firs fastener 88 is described as threadably engaging the steering member 12, it is contemplated that the first fastener 88 may connect the connector arm 42 to the steering member in any desired manner.

A second fastener 98, such as a second bolt, extends through the connector arm 42 into the space between the reduced diameter portion 80 of the steering member or rack 12 and the connector arm. The second fastener 98 may threadably engage the connector arm 42 to prevent relative movement between the second fastener and the connector arm. It is contemplated that the second fastener 98 may have a diameter larger than the space between the reduced diameter portion 80 and the connector arm 42. Although the second fastener 98 is described as threadably engaging the connector arm 42, the second fastener may be connected to the connector arm 42 in any desired manner.

The second fastener 98 extends generally transverse to the longitudinal axis 100 of the rack 12. The second fastener 98 maintains the connection between the rack 12 and the connector arm 42 if the first fastener 88 becomes loose or fails. The second fastener 88 also permits relative movement or lash between the rack 12 and the connector arm 42 if the first fastener 88 fails. The rack 12 may move along the longitudinal axis 100 relative to the connector arm 42 when the first fastener 88 does not prevent relative movement between the rack and the connector arm. The relative movement or lash between the rack 12 and the connector arm 42 is felt by an operator of the vehicle. The lash felt by the operator signals the operator that the first fastener 88 has failed. The second fastener 98 may permit excess rotation of the steering wheel 34 of between 10° and 40°, and preferably about 30°.

In operation, when the steering wheel 34 rotates in a first direction to rotate the pinion 26, the valve 60 directs hydraulic fluid through the fluid line 64 and into the chamber 50 of the steering motor 40. At the same time, the valve 60 directs fluid from the chamber 48 to the reservoir via the fluid lines 82, 68. Fluid pressure built up within the chamber 50 relative to the chamber 48 causes the piston 52 and rod 54 of the motor 40 to move linearly relative to the cylinder 46, e.g., leftward as viewed in FIG. 1. The leftward moving connector arm 42 and rod 54 assist movement of the steering member or rack 12 and the steering linkages 18, thereby causing the steerable wheels 14, 16 to turn in a first turning direction.

Likewise, when the steering wheel 34 rotates to move the rack portion 30 of the steering member 12 in a second linear direction opposite to the first direction, e.g., rightward as viewed in FIG. 1, the valve 60 directs hydraulic fluid through the fluid line 62 and into the chamber 48 of the steering motor 40. At the same time, the valve 60 directs fluid from the chamber 50 to the reservoir via the fluid lines 64, 68. Fluid pressure built up within the chamber 48 relative to the chamber 50 causes the piston 52 and rod 54 to move linearly relative to the cylinder 46, e.g., rightward as viewed in FIG. 1. The rightward moving connector arm 42 and rod 54 assist movement of the rack 12 and the steering linkages 18, thereby causing the steerable wheels 14, 16 to turn in a second turning direction opposite the first turning direction. Therefore, the steering motor 40 provides steering assist in both turning directions of the steering wheel 34.

If the first fastener or bolt 88 becomes loose, fails or no longer connects the connector arm 42 to the steering member or rack 12, then the rack may move relative to the connector arm. The second fastener 98 maintains the connection between the connector arm 42 and the rack 12 while permitting relative movement between the connector arm 42 and the rack 12. The second fastener 98 limits the movement of the rack 12 relative to the connector arm 42. When one of the lip 74 or the axial ends of the reduced diameter portion 80 engages the second fastener 98, the rack 12 and the connector arm may move together to turn the steerable vehicle wheels 14 and 16. Therefore, steering control of the vehicle is not lost. An operator of the vehicle senses the relative movement between the rack 12 and the connector arm 42 to signal that the first fastener 88 needs to be inspected.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels comprising:
    an axially movable steering member, the steering member turning the steerable vehicle wheels upon axial movement of the steering member;
    a single piece connector arm connected to the steering member and movable with the steering member;
    a first fastener connecting the connector arm to the steering member and preventing relative movement between the steering member and the connector arm; and
    a second fastener connecting the connector arm to the steering member, the second fastener permitting relative movement between the steering member and the connector arm when the second fastener is substantially tightened.

2. An apparatus as set forth in claim 1 wherein the first fastener threadably engages the steering member to clamp the connector arm to the steering member.

3. An apparatus as set forth in claim 2 wherein the first fastener is coaxial with the steering member.

4. An apparatus as set forth in claim 1 wherein the second fastener extends into a space between the steering member and the connector arm.

5. An apparatus as set forth in claim 4 wherein the steering member has a reduced diameter portion extending into an opening in the connector arm, the reduced diameter portion being spaced from the connector arm, the second fastener extending into a space defined by the reduced diameter portion.

6. An apparatus as set forth in claim 5 wherein the second fastener threadably engages the connector arm.

7. An apparatus as set forth in claim 1 wherein the steering member has a rack portion in meshing engagement with a pinion, the pinion rotating in response to rotation of a steering wheel of the vehicle.

8. An apparatus as set forth in claim 1 wherein the connector arm is connected to a power steering motor that provides steering assist to turn the steerable vehicle wheels, the connector arm moving with a portion of the power steering motor.

9. An apparatus for use in turning steerable vehicle wheels comprising:
    an axially movable steering member, the steering member having a rack portion in meshing engagement with a pinion, the pinion rotating in response to rotation of a steering wheel of the vehicle to axially move the steering member and turn the steerable vehicle wheels;
    a power steering motor that provides steering assist to turn the steerable vehicle wheels;
    a connector arm connecting the steering member to the power steering motor, the connector arm being moveable with the steering member and a portion of the power steering motor;
    a first fastener connecting the connector arm to the steering member and preventing relative movement between the steering member and the connector arm; and a second fastener connecting the connector arm to the steering member, the second fastener permitting relative movement between the steering member and the connector arm.

10. An apparatus as set forth in claim 9 wherein the first fastener is coaxial with the steering member and threadably engages the steering member to clamp the connector arm to the steering member.

11. An apparatus as set forth in claim 9 wherein the steering member has a reduced diameter portion extending into an opening in the connector arm, the reduced diameter portion being spaced from the connector arm, the second fastener extending into a space defined by the reduced diameter portion.

12. An apparatus as set forth in claim 11 wherein the second fastener extends generally transverse to a longitudinal axis of the steering member.

13. An apparatus as set forth in claim 11 wherein the second fastener threadably engages the connector arm.

14. An apparatus for use in turning steerable vehicle wheels comprising:
    an axially movable steering member, the steering member turning the steerable vehicle wheels upon axial movement of the steering member;
    a single piece connector arm connected to the steering member and movable with the steering member;
    a first fastener connecting the connector arm to the steering member and preventing relative movement between the steering member and the connector arm; and
    a second fastener connecting the connector arm to the steering member, the second fastener permitting relative movement between the steering member and the connector arm, the second fastener extending generally transverse to a longitudinal axis of the steering member.

* * * * *